US010117159B2

(12) United States Patent
Sedlacek

(10) Patent No.: US 10,117,159 B2
(45) Date of Patent: Oct. 30, 2018

(54) NETWORK ADDRESS RESOLUTION FOR INTERWORKING BETWEEN CELLULAR NETWORK DOMAIN AND WIRELESS LOCAL AREA NETWORK DOMAIN

(71) Applicant: Telefonaktiebolaget LM Ericsson (publ), Stockholm (SE)

(72) Inventor: Ivo Sedlacek, Hovorcovice (CZ)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 77 days.

(21) Appl. No.: 15/119,515

(22) PCT Filed: Feb. 25, 2014

(86) PCT No.: PCT/EP2014/053623
§ 371 (c)(1),
(2) Date: Aug. 17, 2016

(87) PCT Pub. No.: WO2015/127958
PCT Pub. Date: Sep. 3, 2015

(65) Prior Publication Data
US 2017/0064614 A1 Mar. 2, 2017

(51) Int. Cl.
*H04W 48/14* (2009.01)
*H04L 29/12* (2006.01)
(Continued)

(52) U.S. Cl.
CPC ......... *H04W 48/14* (2013.01); *H04L 61/1511* (2013.01); *H04L 61/305* (2013.01);
(Continued)

(58) Field of Classification Search
None
See application file for complete search history.

(56) References Cited

U.S. PATENT DOCUMENTS

2003/0134650 A1* 7/2003 Sundar .................. H04W 48/18
455/465
2004/0077374 A1* 4/2004 Terry .................... H04W 36/14
455/552.1
(Continued)

FOREIGN PATENT DOCUMENTS

WO WO 2014109510 A1 * 7/2014 ............ H04W 48/08
WO WO-2014109510 A1 * 7/2014 ............ H04W 48/08

OTHER PUBLICATIONS

IEEE Standard Association, "IEEE Standard forInformation technology—Telecommunications and information exchangebetween systems—Local and metropolitan area networks—Specific requirements. Part 11: Wireless LAN Medium AccessControl (MAC)and Physical Layer (PHY) Specifications. Amendment 9: Interworking with External Networks", IEEE Std 802.11u-2011, Feb. 25, 2011, pp. 1-208, IEEE.
(Continued)

*Primary Examiner* — Andrew Lai
*Assistant Examiner* — Jamaal R Henson
(74) *Attorney, Agent, or Firm* — Coats & Bennett, PLLC

(57) ABSTRACT

A user equipment (50) receives a management frame (202) from an access point (150) of a wireless local area network domain. The management frame (202) indicates an identity of the access point (50). The user equipment (50) sends a report (203, 204) indicating the identity of the access point (150) to a node (110) of a cellular network domain. Using the indicated identity and a network address database, the node (110) resolves a network address associated with the access point (150). The node then sends a request (211) to the resolved network address and, in response to the request (211), receives information on the access point (150).

14 Claims, 9 Drawing Sheets

(51) Int. Cl.
  *H04W 84/10* (2009.01)
  *H04W 84/12* (2009.01)
  *H04W 88/08* (2009.01)

(52) U.S. Cl.
  CPC .......... *H04W 84/105* (2013.01); *H04W 84/12* (2013.01); *H04W 88/08* (2013.01)

(56) References Cited

U.S. PATENT DOCUMENTS

| | | | |
|---|---|---|---|
| 2005/0153692 A1* | 7/2005 | Hwang | H04W 48/12 455/434 |
| 2006/0126565 A1* | 6/2006 | Shaheen | H04W 36/0022 370/331 |
| 2009/0010399 A1* | 1/2009 | Kim | H04L 12/2856 379/45 |
| 2009/0135758 A1* | 5/2009 | Alper | H04L 29/12113 370/328 |
| 2014/0050320 A1 | 2/2014 | Choyi et al. | |
| 2014/0204850 A1* | 7/2014 | Kim | H04L 5/0078 370/329 |

OTHER PUBLICATIONS

IEEE Standard Association, "IEEE Standard for Information technology—Telecommunications and information exchange between systems—Local and metropolitan area networks—Specific requirements. Part 11: Wireless LAN Medium Access Control (MAC) and Physical Layer (PHY) Specifications", IEEE Std 802.00-2007, Jun. 12, 2007, pp. 1-1233, IEEE.

Samsung, "Requirement fulfillment of solution 3", 3GPP TSG-RAN2 Meeting #83, Barcelona, Spain, Aug. 19, 2013, pp. 1-4, R2-132378, 3GPP.

4G Americas, "Integration of Cellular and Wi-Fi Networks", Sep. 1, 2013, pp. 1-65, retrieved on Aug. 17, 2016, retrieved from internet: http://www.4gamericas.org/files/3114/0622/2546/integration_of_Cellular_and_WiFi_Networks_White_Paper-_9.25.13.pdf.

3rd Generation Partnership Project, "3rd Generation Partnership Project; Technical Specification Group Radio Access Network; Study on Wireless Local Area Network (WLAN)—3GPP radio interworking (Release 12)", Technical Report, 3GPP TR 37.834 V12.0.0, Dec. 1, 2013, pp. 1-17, 3GPP, France.

* cited by examiner

NETWORK ADDRESS RESOLUTION FOR INTERWORKING BETWEEN CELLULAR NETWORK DOMAIN AND WIRELESS LOCAL AREA NETWORK DOMAIN

TECHNICAL FIELD

The present invention relates to methods for supporting interworking between a cellular network and a wireless local area network (WLAN), and to corresponding devices.

BACKGROUND

In some implementations of cellular networks as specified by the $3^{rd}$ Generation Partnership Project (3GPP) also WLAN accesses may be used for carrying data traffic of a user equipment (UE). For example, 3GPP TR 37.834 V12.0.0 (2013-12) proposes solutions in which a node of the cellular radio access network, such as a base station of the LTE (Long Term Evolution) radio technology referred to as eNB, controls utilization of an WLAN access point (AP) by the UE. For this purpose, the node needs to be aware of WLAN APs which are "visible" to the UE, i.e., which can be discovered by the UE.

The UE can to discover the WLAN APs by listening to beacon frames transmitted by the WLAN APs, or by sending a probe request frame and receiving a probe response frame. However, controlling utilization of such WLAN APs may require additional information on the WLAN AP, such as information about 3GPP or non-3GPP networks connected to the WLAN AP.

One possibility to obtain such additional information is to make use of the Access Network Query Protocol (ANQP) as specified in IEEE 802.11-2012, which allows the UE to query parameters of the WLAN AP.

However, using the ANQP requires data exchange between the UE and the WLAN AP and subsequent reporting of the discovered parameters to the cellular network, which is not desirable in view of battery consumption of the UE, specifically when considering that such parameters may be subject to dynamic variations, so that frequent reporting may be needed.

Accordingly, there is a need for techniques which allow for efficiently obtaining information on a WLAN AP discovered by a UE.

SUMMARY

According to an embodiment of the invention, a method of supporting interworking between a cellular network domain and a WLAN domain is provided. According to the method, a node of the cellular network domain receives a report from a UE. The report indicates an identity of an AP of the WLAN domain, as indicated in a management frame received by the UE from this AP. Using the indicated identity and a network address database, the node resolves a network address associated with the AP. The node then sends a request to the resolved network address and, in response to the request, receives information on the AP.

According to a further embodiment of the invention, a method of supporting interworking between a cellular network domain and a WLAN domain is provided. According to the method, a UE receives a management frame from an AP of the WLAN domain. The management frame indicates an identity of the AP. The UE then sends a report to a node of the cellular network domain. The report indicates the identity of the AP. The UE then receives information on the AP from the node of the cellular network domain.

According to a further embodiment of the invention, a method of supporting interworking between a cellular network domain and a WLAN domain is provided. According to the method, a node of the WLAN domain obtains an identity of an AP of the WLAN domain and a network address of the AP. On the basis of the obtained identity and network address, the node updates a network address database.

According to a further embodiment of the invention, a device for implementing a node of a cellular network domain is provided. The device comprises a first interface for communication with a UE. Further, the device comprises a second interface for communication with a WLAN domain. Further, the device comprises a third interface for communication with a network address database. Further, the device comprises at least one processor. The at least one processor is configured to receive a report from the UE. The report indicates an identity of an AP of the WLAN domain, as indicated in a management frame received by the UE from this AP. Further, the at least one processor is configured to resolve, using the indicated identity and the network address database, a network address associated with the AP. Further, the at least one processor is configured to send a request to the resolved network address and, in response to the request, receive information on the AP.

According to a further embodiment of the invention, a UE is provided. The UE comprises a first interface for radio access to a cellular network domain. Further, the UE comprises a second interface for radio access to a WLAN domain. Further, the UE comprises at least one processor. The at least one processor is configured to receive a management frame from an AP of the WLAN domain. The management frame indicates an identity of the AP. Further, the at least one processor is configured to send a report to a node of the cellular network domain. The report indicates the identity of the AP. Further, the at least one processor is configured to then receive information on the AP from the node of the cellular network domain.

According to a further embodiment of the invention, a device for implementing a node of a WLAN domain is provided. The device comprises an interface for communication with a network address database. Further, the device comprises at least one processor. The at least one processor is configured to obtain an identity of an AP of the WLAN domain and a network address of the AP. Further, the at least one processor is configured to update a network address database on the basis of the obtained identity and network address.

According to a further embodiment of the invention, a computer program or computer program product is provided, e.g., in the form of a non-transitory storage medium, which comprises program code to be executed by at least one processor of a device for implementing a node of a cellular network domain. Execution of the program code causes the at least one processor to receive a report from a UE. The report indicates an identity of an AP of a WLAN domain, as indicated in a management frame received by the UE from this AP. Further, execution of the program code causes the at least one processor to resolve, using the indicated identity and the network address database, a network address associated with the AP. Further, execution of the program code causes the at least one processor to send a request to the resolved network address and, in response to the request, receive information on the AP.

According to a further embodiment of the invention, a computer program or computer program product is provided, e.g., in the form of a non-transitory storage medium, which comprises program code to be executed by at least one processor of a UE. Execution of the program code causes the at least one processor to receive a management frame from an AP of a WLAN domain. The management frame indicates an identity of the AP. Further, execution of the program code causes the at least one processor to send a report to a node of the cellular network domain. The report indicates the identity of the AP. Further, execution of the program code causes the at least one processor to then receive information on the AP from the node of the cellular network domain.

According to a further embodiment of the invention, a computer program or computer program product is provided, e.g., in the form of a non-transitory storage medium, which comprises program code to be executed by at least one processor of a device for implementing a node of a WLAN domain. Execution of the program code causes the at least one processor to obtain an identity of an AP of the WLAN domain and a network address of the AP. Further, execution of the program code causes the at least one processor to update a network address database on the basis of the obtained identity and network address.

Details of such embodiments and further embodiments will be apparent from the following detailed description of embodiments.

DETAILED DESCRIPTION OF EMBODIMENTS

Figure 1:
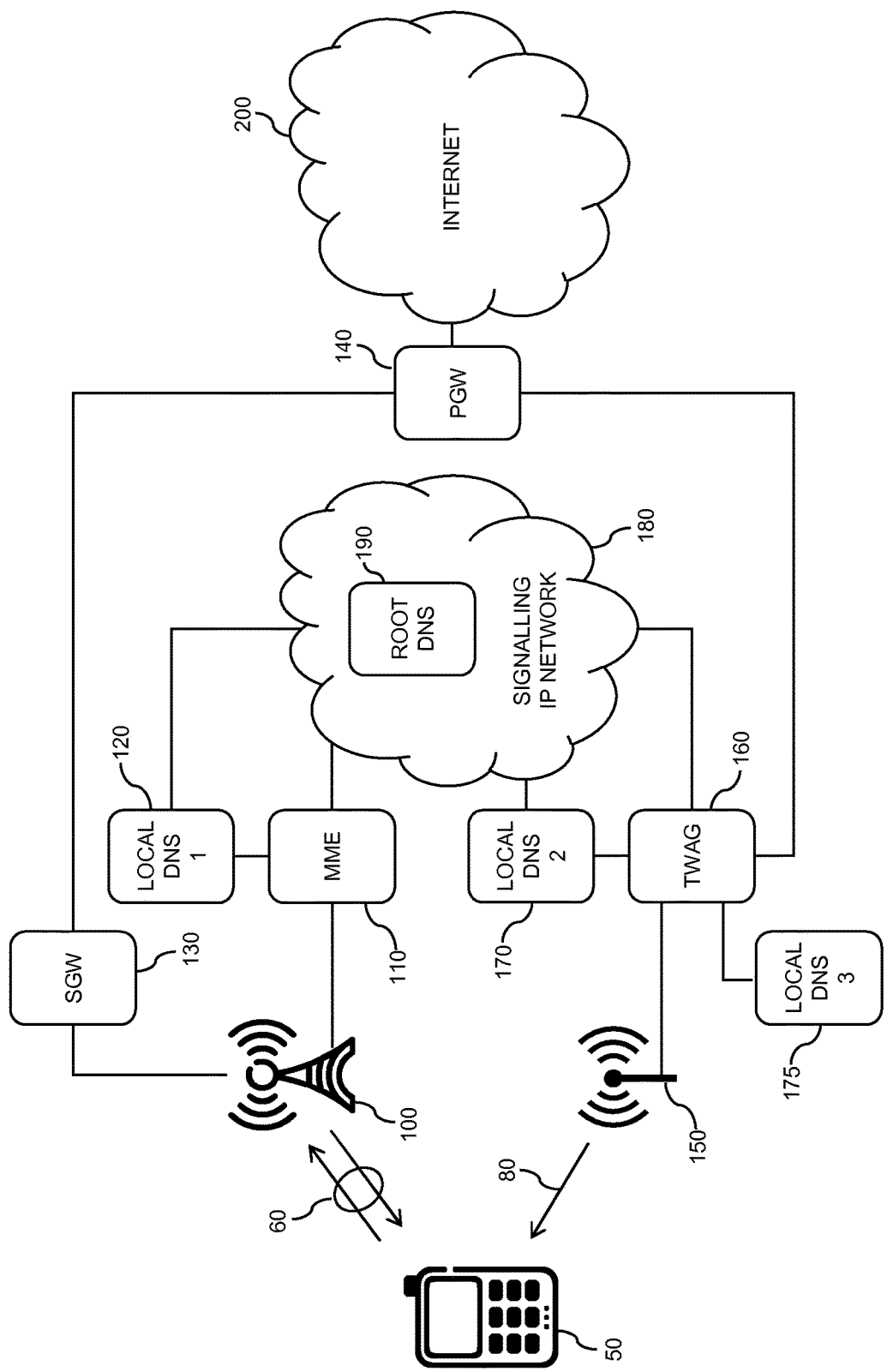
FIG. 1 schematically illustrates an exemplary implementation of interworking between a cellular network domain and a WLAN domain according to an embodiment of the invention.

In the following, concepts according to embodiments of the invention will be explained in more detail by referring to the accompanying drawings. The illustrated concepts relate to supporting interworking between a cellular network domain and a WLAN domain of a communication network. In the illustrated embodiments, it is assumed that the cellular network domain is based on a cellular network technology as specified by 3GPP, in particular the LTE technology. However, it is to be understood that the illustrated concepts could be applied in a corresponding manner to cellular network technologies, e.g., GSM (Global System for Mobile Communications), UMTS (Universal Mobile Telecommunications System), or CDMA2000.

In the concepts as illustrated herein, the cellular network domain and the WLAN domain may be operated by different entities, and an operator of the WLAN domain may for example have a service level agreement with an operator of the cellular network domain, which specifies conditions of utilization of an AP of the WLAN domain by a UE which is operated on the basis of a subscription with the operator the cellular network domain. In the illustrated concepts, it is assumed that a decision whether to utilize the AP of the WLAN domain is taken by a node of the cellular network domain or some cases by the UE, and that this decision is taken on the basis of information of the AP of the WLAN domain, such as a currently available capacity, a current load on an radio interface of the AP, a current load on an Internet interface of the AP, currently applicable limitations, or the like. The decision may be based on conditions depending on such information, such as defined by the service level agreement between the operators.

In the illustrated concepts, an interface between the cellular network domain and the WLAN domain may be used for providing the node of the cellular network domain or the UE with the required information on the AP of the WLAN domain. For this purpose, a network address associated with the AP of the WLAN domain is resolved to enable the node of the cellular network domain to request the required information on the AP of the WLAN domain from this network address. The resolution of the network address is based on an identifier (ID) of the AP as indicated in a management frame transmitted by the AP and received by the UE. The UE may then report this ID of the AP to the node of the cellular network. The management frame may for example be a beacon frame or a probe response frame according to IEEE 802.11-2012. The ID of the AP may include a BSSID (Basic Service Set Identifier), a HSSID (Homogeneous Extended Service Set Identifier) and/or an SSID (Service Set Identifier). The network address may be assigned to the AP itself or may be assigned to some other node in the WLAN domain, which acts as a proxy providing the information on the AP of the WLAN domain, i.e., handles the request for the information on the AP of the WLAN domain on behalf of the AP. In the illustrated concepts, a network address database is provided to allow resolution of the network address associated with the AP of the WLAN domain.

According to exemplary implementations explained in the following, the network address database is based on the Domain Name System (DNS) according to Internet Standards RFC 1034 and 1035. In these implementations, the DNS is supplemented with a record which allows the node of the cellular network domain to resolve an Internet Protocol (IP) address of the AP or of a proxy for the AP by using a fully qualified domain name (FQDN) which is constructed from the ID of the AP, e.g., from the BSSID and the HESSID. Using this IP address, the node of the cellular network may then request information on the AP, without requiring further activity of the UE. Accordingly, the information on the AP can be obtained in a manner which saves battery power and other resources of the UE. The DNS record for the AP may be managed by the operator of the WLAN domain. In some implementations, the DNS record may be automatically updated by a node of the WLAN domain, e.g., using dynamic DNS procedures, such as specified in Internet Standard RFC 2136.

FIG. 1 schematically illustrates a communication network environment for implementing the concepts. In particular, FIG. 1 shows a base station 100, in accordance with the illustrated LTE implementation referred to as eNodeB (eNB), a Mobility Management Entity (MME) 110, a first local DNS server 120, a Serving Gateway (SGW) 130, and a Packet Data Network Gateway (PGW) 140, which are part of a cellular network domain. Further, FIG. 1 shows a WLAN AP 150, a Trusted Wireless Access Gateway (TWAG) 160, a second local DNS server 170, and a third local DNS server 175, which are part of a WLAN domain. Further, FIG. 1 shows a signalling IP network 180 which connects the cellular network domain and the WLAN domain. As illustrated, the signalling IP network 180 may also include a root DNS server 190. Still further, FIG. 1 illustrates a UE 50 which may access the Internet 200 via the cellular network domain and/or the WLAN domain. The UE 50 may for example correspond to a mobile phone, a portable computer, or the like.

In the scenario as illustrated in FIG. 1, the UE 50 has a radio connection to the cellular network domain, in particular to the eNB 100. Communication of user plane data between the UE 50 and the Internet 200 is performed via the SGW 130 and the PGW 140. Further, the UE 50 may communicate control plane data with the eNB 100 and/or the MME 110, e.g., with respect to managing mobility of the UE 50 between different accesses. Further, the UE 50 is within the coverage region of the WLAN AP 150. Accordingly, the UE 50 is capable of discovering the WLAN AP 150 by receiving a beacon frame 80 transmitted by the WLAN AP 150. Alternatively, the UE 50 could discover the WLAN AP 150 by sending a probe request frame and receiving a probe response frame from the WLAN AP 150. The WLAN AP 150 may be utilized by the UE 50 as an alternative or in additional access to the Internet 200. In such case, communication of user plane data between the UE 50 and the Internet 200 may be accomplished via the TWAG 160 and the PGW 140. In an alternative architecture, another type of gateway may be used in place of the TWAG 160, e.g., a signalling gateway which provides a control-plane connection to the signalling IP network 180, but carries no user-plane traffic. Further, the eNB 110 or the WLAN AP 150 could have a direct interface to the signalling IP network.

In the illustrated scenario, the decision whether the UE 50 should utilize the WLAN AP 150 for accessing the Internet 200 may be taken by the MME 110, by the eNB 100 or by the UE 50. Such decision is typically based on information on the WLAN AP 150, e.g., a current available capacity of the WLAN AP 150, a current load of WLAN AP 150, a radio configuration of the WLAN AP 150, applicable limits, or the like.

In the illustrated concepts, a node of the cellular network domain, e.g., the MME 110 or the eNB 100, may obtain such information on the WLAN AP 150 via the signalling IP network 180. For this purpose, the UE 50 reports the ID of the WLAN AP 150, as indicated in the beacon frame 80 or probe response frame transmitted by the WLAN AP 150, to the eNB 100 or to the MME 110. The eNB 100 or MME 110 may then construct a FQDN from the ID of the WLAN AP 150 and use the DNS network address database to resolve an IP address associated with the WLAN AP 150. This may involve querying the first local DNS server 120, the second local DNS server 170, or the root DNS server 190. The third local DNS server 175 may in turn be used within the WLAN domain for resolving local IP addresses.

The construction of the FQDN may be accomplished according to the following principles: A DNS domain is defined for the DNS records which are used for resolving IP addresses of WLAN APs according to the concepts as described herein. In the following examples, it is assumed that this DNS domain has the domain name "3gppnetwork.org". The DNS domain may for example be managed by a central entity, e.g., 3GPP or GSMA (GSM Association).

According to a first alternative, a subdomain of this domain may be created for each operator of a WLAN domain which wishes to enable requests of information on WLAN APs in its WLAN domain. For example, the name of this subdomain may be constructed by prepending the HESSID as qualifier to the domain name, e.g., according to the syntax "hessid<HESSID>.3gppnetwork.org", where <HESSID> is a placeholder for the HESSID of the WLAN AP. A DNS record for this subdomain is created, which may for example be point to the IP address of a local DNS server of the WLAN domain, e.g., the second local DNS server 170 of FIG. 1. The subdomain may be created by the central entity upon request from the operator of the WLAN domain. For example, if the HESSID used for the WLAN APs of the WLAN domain is "00235447F7B4", the name of the subdomain would be constructed as "hessid00235447F7B4.3gppnetwork.org".

For each WLAN AP in the WLAN domain, a further subdomain of the subdomain may be created. The FQDN of this further subdomain may be created by prepending the BSSID as qualifier to the name of the subdomain, e.g., according to the syntax "bssid<BSSID>.hessid<HESSID>.3gppnetwork.org", where <BSSID> is a placeholder for the BSSID of the WLAN AP. Further, a DNS record which associates this FQDN with the IP address to be used for requesting information on the WLAN AP is created and stored in the local DNS server of the WLAN domain. For example, if the BSSID of the WLAN AP is 24770320D8D0, the FQDN would be "bssid24770320D8D0.hessid00235447F7B4.3gppnetwork.org". Alternatively, the creation of the further subdomain may be omitted and the DNS record may be created directly in the subdomain, e.g., as an A record or AAAA record in "hessid<HESSID>.3gppnetwork.org".

According to a second alternative, a proxy may be used for handling the requests for the information on the WLAN AP. For example, the TWAG 160 of FIG. 1 could implement such proxy functionalities. Also in the second alternative, a subdomain is created for each operator of a WLAN domain which wishes to enable requests of information on WLAN APs in its WLAN domain. As in the first alternative, the name of this subdomain may be constructed by prepending the HESSID as qualifier to the domain name, e.g., according to the syntax "hessid<HESSID>.3gppnetwork.org", where <HESSID> is a placeholder for the HESSID of the WLAN AP. A DNS record for this subdomain is created, which may for example be point to the IP address of a local DNS server of the WLAN domain, e.g., the second local DNS server 170 of FIG. 1. The subdomain may be created by the central entity upon request from the operator of the WLAN domain. For example, if the HESSID used for the WLAN APs of the WLAN domain is "00235447F7B4", the name of the subdomain would be constructed as "hessid00235447F7B4.3gppnetwork.org".

Then, a FQDN is created by prepending a qualifier to the name of the subdomain which corresponds to the gateway or proxy. For example, the FQDN could be constructed according to the syntax "gateway.hessid<HESSID>.3gppnetwork.org". A DNS record which associates this FQDN with the IP address of the gateway or proxy to be used for requesting information on the WLAN AP is created and stored in the local DNS server of the WLAN domain.

In the first alternative, the node of the cellular network domain may use the IP address which is resolved from the FQDN to directly request the information on the WLAN AP from the resolved IP address. In the second alternative, the node of the cellular network may request the information on the WLAN AP from the gateway or proxy, which may in turn locally obtain the requested information from the WLAN AP. The latter process may in some cases also involve identifying the WLAN AP on the basis of an ID indicated in the request, e.g., the BSSID, and resolving a local IP address of the WLAN AP using a further local DNS server, which is not accessible from outside the WLAN domain, such as for example the third local DNS server 175 of FIG. 1.

Figure 2:
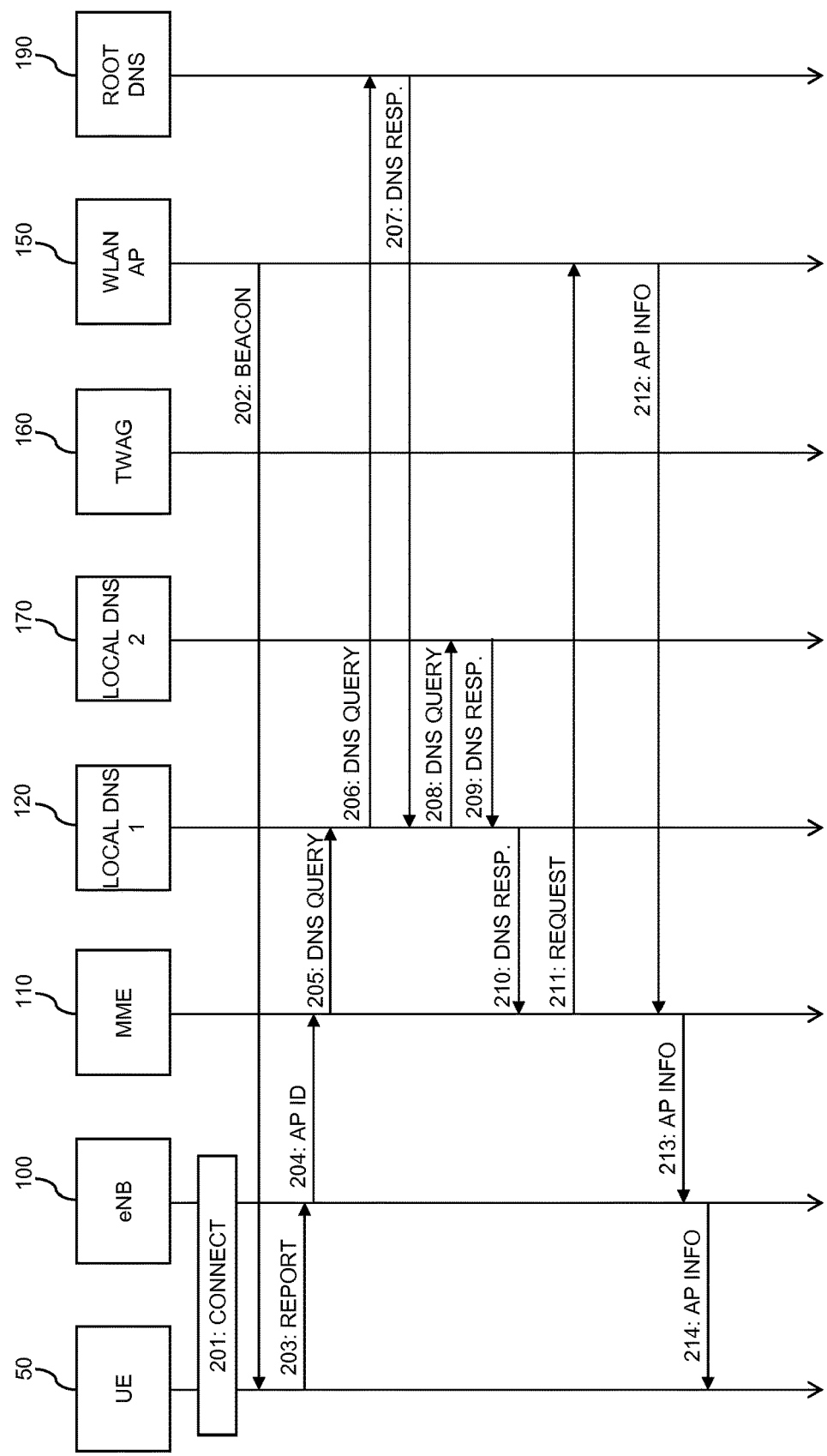
FIG. 2 schematically illustrates exemplary processes according to an embodiment of the invention, which can be used for providing a node of the cellular network domain and/or the UE with information on a WLAN AP.

FIG. 2 shows a signalling diagram for illustrating exemplary processes which may be used in connection with the first alternative of constructing the FQDN. The processes of FIG. 2 involve the UE 50, the eNB 100, the MME 110, the first local DNS server 120, the WLAN AP 150, the TWAG 160, the second local DNS server 170, and the root DNS server 190.

As illustrated by step 201, the UE 50 connects to the cellular network domain. This is accomplished via the eNB 100.

At some point, the UE 50 is in the coverage of the WLAN AP 150 and receives a beacon 202 transmitted by the WLAN AP 150. The beacon frame 202 indicates the BSSID, HESSID, and SSID of the WLAN AP 150.

The UE 50 then sends a report 203 to the eNB 100. The report indicates an ID of the WLAN AP 150 as indicated in the beacon frame 202, e.g., the BSSID, HESSID, and/or SSID as indicated in the beacon frame 202. In the illustrated example, it is assumed that the indicated ID includes the BSSID and the HESSID of the WLAN AP 150. As indicated by 204, the eNB 100 forwards the ID of the WLAN AP to the MME 110, e.g., in a request for information on the WLAN AP or in a forwarded report.

The MME 110 constructs a FQDN from the ID indicated in the report 204. As mentioned above, this may be accomplished according to the syntax "bssid<BSSID>.hessid <HESSID>.3gppnetwork.org", where <BSSID> is a placeholder for the BSSID of the WLAN AP 150 and <HESSID> is a placeholder for the HESSID of the WLAN AP 150.

The MME 110 now resolves the IP address associated with this FQDN. For this purpose, the MME 110 sends a DNS query 205 to the first local DNS server 120. The first local DNS server 120 in turn sends a DNS query 206 to the root DNS server 190 to resolve a DNS server for the subdomain "hessid<HESSID>.3gppnetwork.org". The root DNS sends a DNS response 207 which indicates the IP address of the second local DNS server 170 in the WLAN domain. The first local DNS server 120 now sends a DNS query 208 to the second local DNS server 170 to resolve the IP address associated with the FQDN, and the second local DNS server 170 sends a DNS response 209 which indicates the IP address of the WLAN AP 150. The first local DNS server 120 then in turn sends a DNS response 210 indicating the IP address of the WLAN AP 150 to the MME 110.

Using the IP address indicated in the DNS response 210, the MME 110 then sends a request 211 for AP information to the WLAN AP 150. In the architecture of FIG. 1, the request 211 may be forwarded by the TWAG 160. The WLAN AP 150 responds with the requested AP information, as indicated by 212. Also the response 212 may be forwarded by the TWAG 160. The AP information may for example include a currently available capacity of the WLAN AP 150, a current load on the radio interface of the WLAN AP 150, a current load on the Internet interface of the WLAN AP 150, currently applicable limitations, a radio configuration of the WLAN AP 150, access credentials to be used for connecting to the WLAN AP 150, an identifier of the operator of the WLAN domain, or the like. The MME 110 may forward at least a part of the AP information 212 to the eNB 100, as indicated by 213. Similarly, the eNB 100 may forward at least a part of the AP information 213 to the UE 50, as indicated by 214. The MME 110, eNB 110 and/or UE 50 may then use the received AP information for controlling utilization of the WLAN AP 150 by the UE 50.

Figure 3:
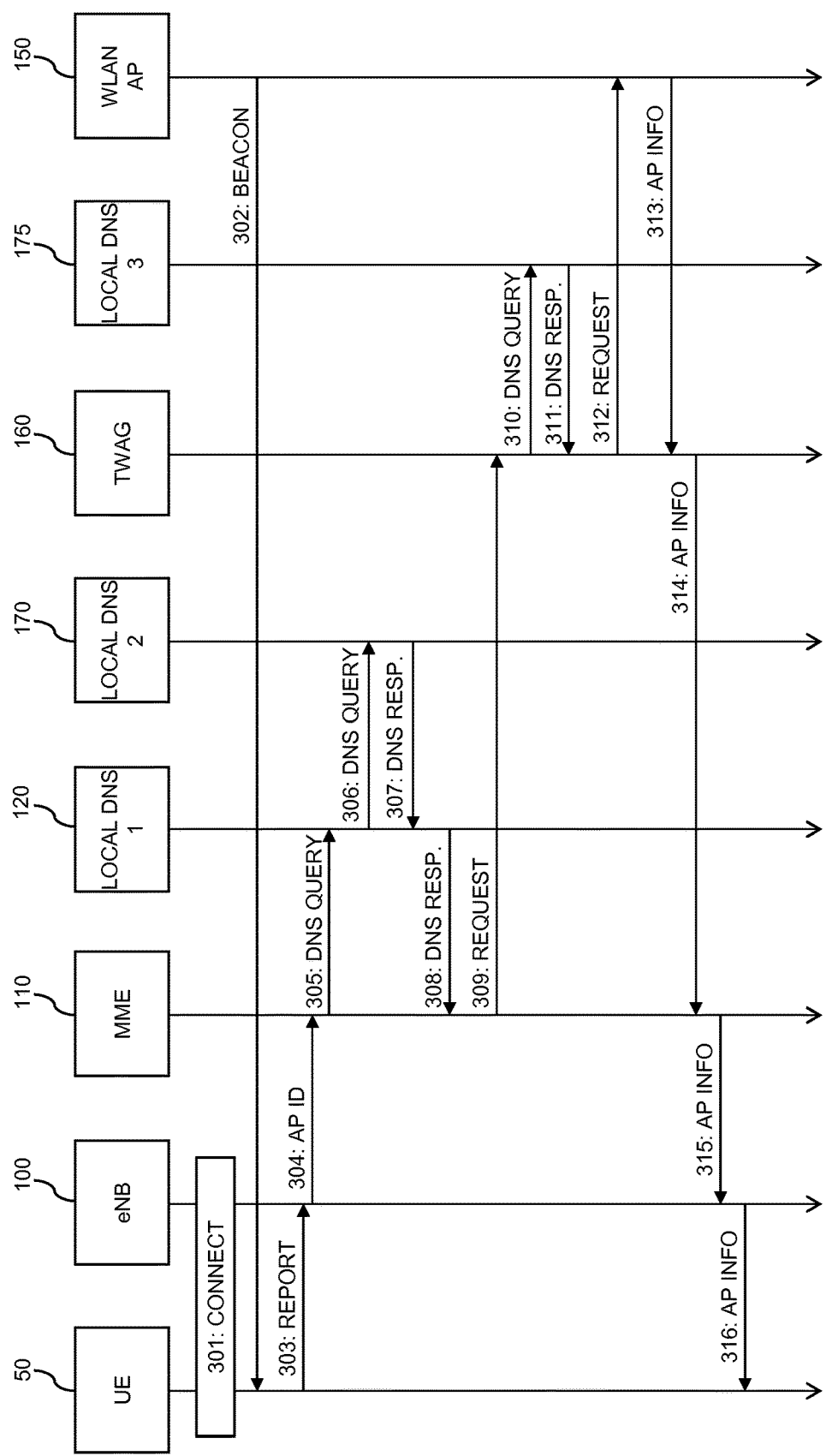
FIG. 3 schematically illustrates further exemplary processes according to an embodiment of the invention, which can be used for providing a node of the cellular network domain and/or the UE with information on a WLAN AP.

FIG. 3 shows a signalling diagram for illustrating exemplary processes which may be used in connection with the second alternative of constructing the FQDN. The processes of FIG. 3 involve the UE 50, the eNB 100, the MME 110, the first local DNS server 120, the WLAN AP 150, the TWAG 160, the second local DNS server 170, and the third local DNS server 175.

As illustrated by step 301, the UE 50 connects to the cellular network domain. This is accomplished via the eNB 100.

At some point, the UE 50 is in the coverage of the WLAN AP 150 and receives a beacon 302 transmitted by the WLAN AP 150. The beacon frame 302 indicates the BSSID, HESSID, and SSID of the WLAN AP 150.

The UE 50 then sends a report 303 to the eNB 100. The report indicates an ID of the WLAN AP 150 as indicated in the beacon frame 302, e.g., the BSSID, HESSID, and/or SSID as indicated in the beacon frame 202. In the illustrated example, it is assumed that the indicated ID includes the BSSID and the HESSID of the WLAN AP 150. As indicated by 304, the eNB 100 forwards ID of the WLAN AP to the MME 110, e.g., in a request for information on the WLAN AP or in a forwarded report.

The MME 110 constructs a FQDN from the ID indicated in the report 304. As mentioned above, this may be accomplished according to the syntax "gateway.hessid <HESSID>.3gppnetwork.org", where <HESSID> is a placeholder for the HESSID of the WLAN AP 150, which is homogeneously used for all WLAN APs in the WLAN domain of the WLAN AP 150.

The MME 110 now resolves the IP address associated with this FQDN. For this purpose, the MME 110 sends a DNS query 305 to the first local DNS server 120. The first local DNS server 120 in turn sends a DNS query 306 to the second local DNS server 170 to resolve the IP address associated with the FQDN, and the second local DNS server 170 sends a DNS response 307 which indicates the IP address of the TWAG 160. The first local DNS server 120 then in turn sends a DNS response 308 indicating the IP address of the TWAG 160 to the MME 110.

Using the IP address indicated in the DNS response 210, the MME 110 then sends a request 309 for AP information to the TWAG 160. The request 309 indicates the BSSID of the WLAN AP 150. The TWAG 160 handles the request 309 by obtaining the requested information from the WLAN AP 150. For this purpose, the TWAG 160 may first need to resolve the local IP address of the WLAN AP 150. Accordingly, the TWAG 160 sends a DNS query 310 to the third local DNS server 175, which is accessible only from within the WLAN domain. This DNS query my use a FQDN which is constructed from the BSSID indicated in the request 309. The third local DNS server 175 then sends a DNS response 311 indicating the local IP address of the WLAN AP 150 to the TWAG 160.

Using the IP address indicated in the DNS response 311, the TWAG 160 then sends a request 312 for the AP information to the WLAN AP 150, and the WLAN AP 150 responds with the requested AP information, as indicated by 313. The AP information may for example include a currently available capacity of the WLAN AP 150, a current load on the radio interface of the WLAN AP 150, a current load on the Internet interface of the WLAN AP 150, currently applicable limitations, a radio configuration of the WLAN AP 150, access credentials to be used for connecting to the WLAN AP 150, an identifier of the operator of the WLAN domain, or the like. The TWAG 160 then forwards the AP information 313 to the MME 110, as indicated by 314. The MME 110 may forward at least a part of the AP information 314 to the eNB 100, as indicated by 315. Similarly, the eNB 100 may forward at least a part of the AP information 315 to the UE 50, as indicated by 316. The MME 110, eNB 110 and/or UE 50 may then use the received AP information for controlling utilization of the WLAN AP 150 by the UE 50.

It is to be understood that the processes of FIGS. 2 and 3 are merely exemplary and that in other scenarios different processes may be used. For example, rather than discovering the WLAN AP 150 by receiving the beacon frame 202, 302, the UE 50 could discover the WLAN AP 150 by sending a probe request frame and receiving a probe response frame from the WLAN AP 150. Further, the illustrated hierarchy of DNS queries and DNS responses may differ in other scenarios. For example, a local DNS server may have cached DNS records which allow for omitting some of the illustrated DNS queries. Further, also the processes of FIG. 3 could include steps for querying the root DNS server 190, similar to the processes of FIG. 2. Also, the eNB 100 could directly send a DNS query for the IP address of the WLAN AP, rather than involving the MME 110.

Figure 4:
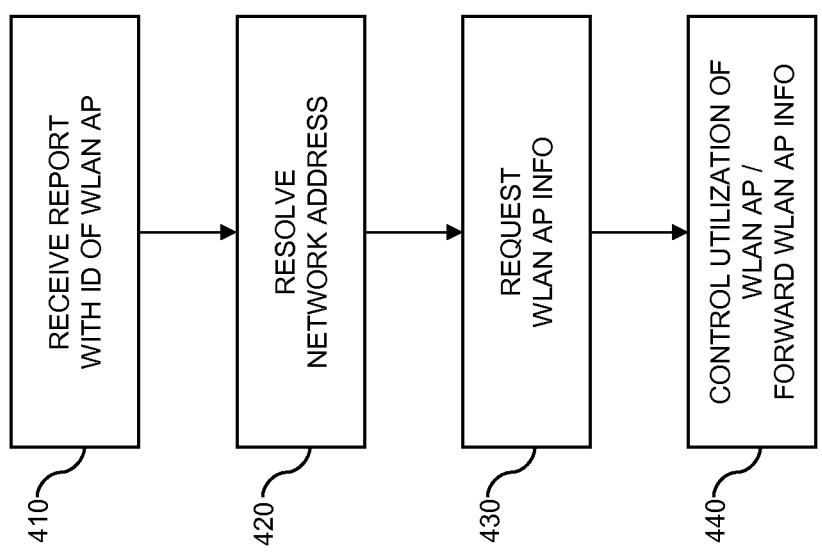
FIG. 4 shows a flowchart for illustrating a method according to an embodiment of the invention, which may be implemented by a node of a cellular network domain.

FIG. 4 shows a flowchart for illustrating a method of supporting interworking between a cellular network domain and a WLAN domain. The method may be used for implementing the above concepts in a node of the cellular network domain, e.g., in the eNB 100 or the MME 110. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 410, the node receives a report from a UE, e.g., from the UE 50. The report indicates an ID of an AP of the WLAN domain. This ID was indicated in a management frame received by the UE from this AP. The ID may be unique and may include a BSSID, a HESSID and/or an SSID of the AP.

At step 420, the node resolves a network address associated with the AP. This is accomplished using the ID indicated in the report of step 410 and a network address database. The network address database may be based on the DNS and may use distributed DNS servers, as illustrated in FIGS. 1, 2, and 3. The resolved network address may be an IP address. When using a DNS based network address database, the node may construct a FQDN from the ID of the AP as indicated in the report of step 410 and obtain the network address on the basis of the FQDN, e.g., by sending one or more DNS queries.

At step 430, the node requests information on the AP. This is accomplished by sending a request to the resolved network address.

At step 440, in response to the request, the node receives information on the AP. The information on the AP may include a currently available capacity of the AP, a current load on a radio interface of the AP, a current load on an Internet interface of the AP, currently applicable limitations, a radio configuration of the AP, access credentials to be used for connecting to the AP, an identifier of the operator of the WLAN domain, or the like. The node may then indicate at least a part of this information to the UE and/or may control utilization of the AP by the UE on the basis of this information.

Figure 5:
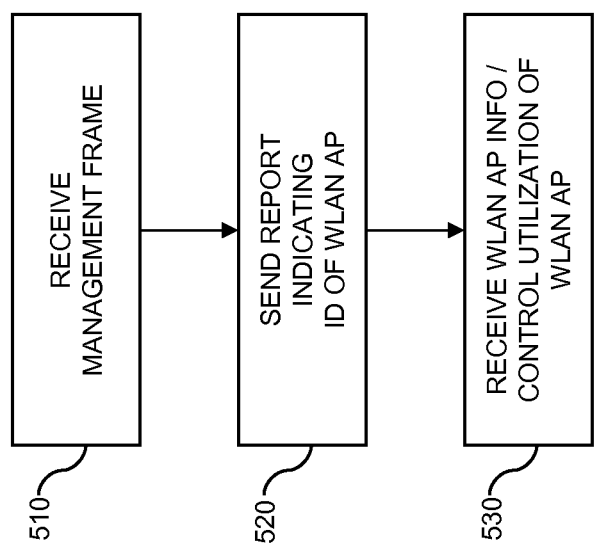
FIG. 5 shows a flowchart for illustrating a method according to an embodiment of the invention, which may be implemented by a UE.

FIG. 5 shows a flowchart for illustrating a method of supporting interworking between a cellular network domain and a WLAN domain. The method may be used for implementing the above concepts in a UE, e.g., in the UE 50. If a processor based implementation of the UE is used, the steps of the method may be performed by one or more processors of the UE. For this purpose, the processor(s) may execute correspondingly configured program code. Further, at least some of the corresponding functionalities may be hardwired in the processor(s).

At step 510, the UE receives a management frame from an AP of the WLAN domain. The management frame may be a beacon frame or a probe response frame. The management frame indicates an ID of the AP. The ID may be unique and may include a BSSID, a HESSID and/or an SSID of the AP.

At step 520, the UE sends a report to a node of the cellular network domain, e.g., to the a base station, such as the eNB 100, or to a control node, such as the MME 110. The report indicates the ID of the AP.

Then, at step 530, the UE receives information on the AP from the node of the cellular network domain. The information on the AP may include a currently available capacity of the AP, a current load on a radio interface of the AP, a current load on an Internet interface of the AP, currently applicable limitations, a radio configuration of the AP, access credentials to be used for connecting to the AP, an identifier of the operator of the WLAN domain, or the like. On the basis of this information, the UE may control its utilization of the AP.

Figure 6:
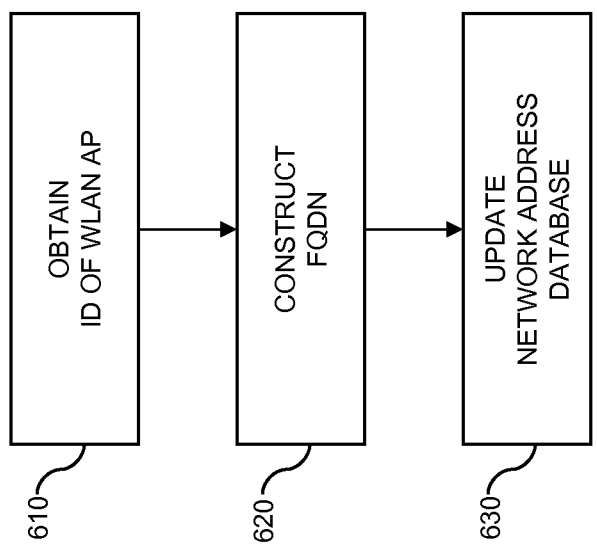
FIG. 6 shows a flowchart for illustrating a method according to an embodiment of the invention, which may be implemented by a node of a WLAN domain.

FIG. 6 shows a flowchart for illustrating a method of supporting interworking between a cellular network domain and a WLAN domain. The method may be used for implementing the above concepts in a node of the WLAN domain, e.g., in the TWAG 160 or the WLAN AP 150. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 610, the node obtains an ID of an AP of the wireless local area network domain and a network address of the AP. The ID of the AP may be unique and may include a BSSID, a HESSID and/or an SSID of the AP. The node may for example request the ID from the AP or obtain the ID from a database. The network address may be an IP address.

At step 620, the node updates a network address database on the basis of the obtained ID and network address. The network address database may be based on the DNS and may use distributed DNS servers, as illustrated in FIGS. 1, 2, and 3. When using such a DNS based network address database, the node may construct a FQDN from the ID of the AP and use the FQDN as a key for a DNS record. The updating of the DNS base network address database may involve creating a new DNS record or modifying an existing DNS record, e.g., using dynamic DNS procedures.

Figure 7:
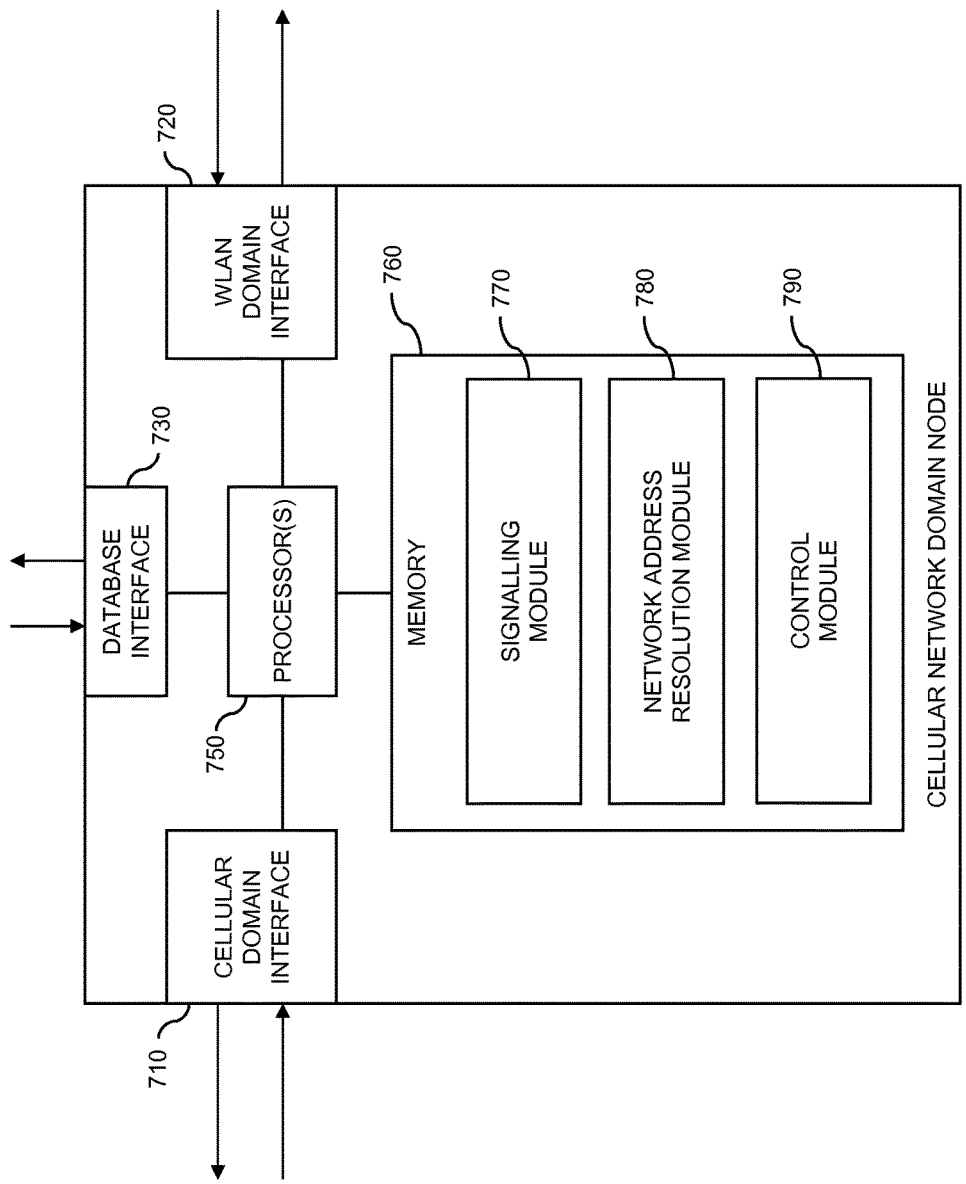
FIG. 7 schematically illustrates a device according to an embodiment of the invention, which may be used for implementing a node of a cellular network domain.

FIG. 7 illustrates exemplary structures of a device for implementing a node for a cellular network domain which operates in accordance with the above concepts. For example, the illustrated structures may be used to implement an eNB, such as the eNB 100, or an MME, such as the MME 110.

In the illustrated example, the node includes a cellular domain interface 710 for communication with other nodes of the cellular network domain or with the UE. Further, the node includes a WLAN domain interface 720 for communication with one or more nodes of the WLAN domain. If the node has functionalities of an eNB, the cellular domain interface 710 may correspond to the LTE Uu radio interface for communication with the UE. If the node has functionalities of an MME, the cellular domain interface 710 may correspond to the S1-MME interface. The WLAN domain interface 720 may correspond to an IP based interface, e.g., using HTTP (Hypertext Transfer Protocol), HTTPS (HTTP Secure), RADIUS according to RFC 2865, or DIAMETER according to RFC 6733. Further, the node includes a database interface 730 for communication with a network address database, e.g., a DNS based network database such as implemented by the DNS servers 120, 170, 175, 190. Also the database interface 730 may be IP based.

Further, the node includes one or more processor(s) 750 coupled to the interfaces 710, 720 and 730, and a memory 760 coupled to the processor(s) 750. The memory 760 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 760 includes suitably configured program code modules to be executed by the processor(s) 750 so as to implement the above-described functionalities of the node of the cellular network domain. More specifically, the program code modules in the memory 760 may include a signalling module 770 so as to implement the above-described functionalities of receiving a report from a UE, sending requests for information on a WLAN AP, and receiving or forwarding the information on the WLAN AP. Further, the program code modules in the memory 760 may include a network address resolution module 780 so as to implement the above-described functionalities of resolving the network address to be used for requesting information on the WLAN AP. Still further, the memory 760 may include a control module 790 so as to implement the above-mentioned functionalities for controlling utilization of the WLAN AP by the UE.

It is to be understood that the structures as illustrated in FIG. 7 are merely schematic and that the node may actually include further components which, for the sake of clarity, have not been illustrated, e.g., further interfaces or further processors. Also, it is to be understood that the memory 760 may include further types of program code modules, which have not been illustrated, e.g., program code modules for implementing known functionalities of an eNB or MME. In some implementations, also a computer program may be provided for implementing functionalities of the node, e.g., in the form of a physical medium storing the program code modules to be stored in the memory 760 or by making such program code available for download.

Figure 8:
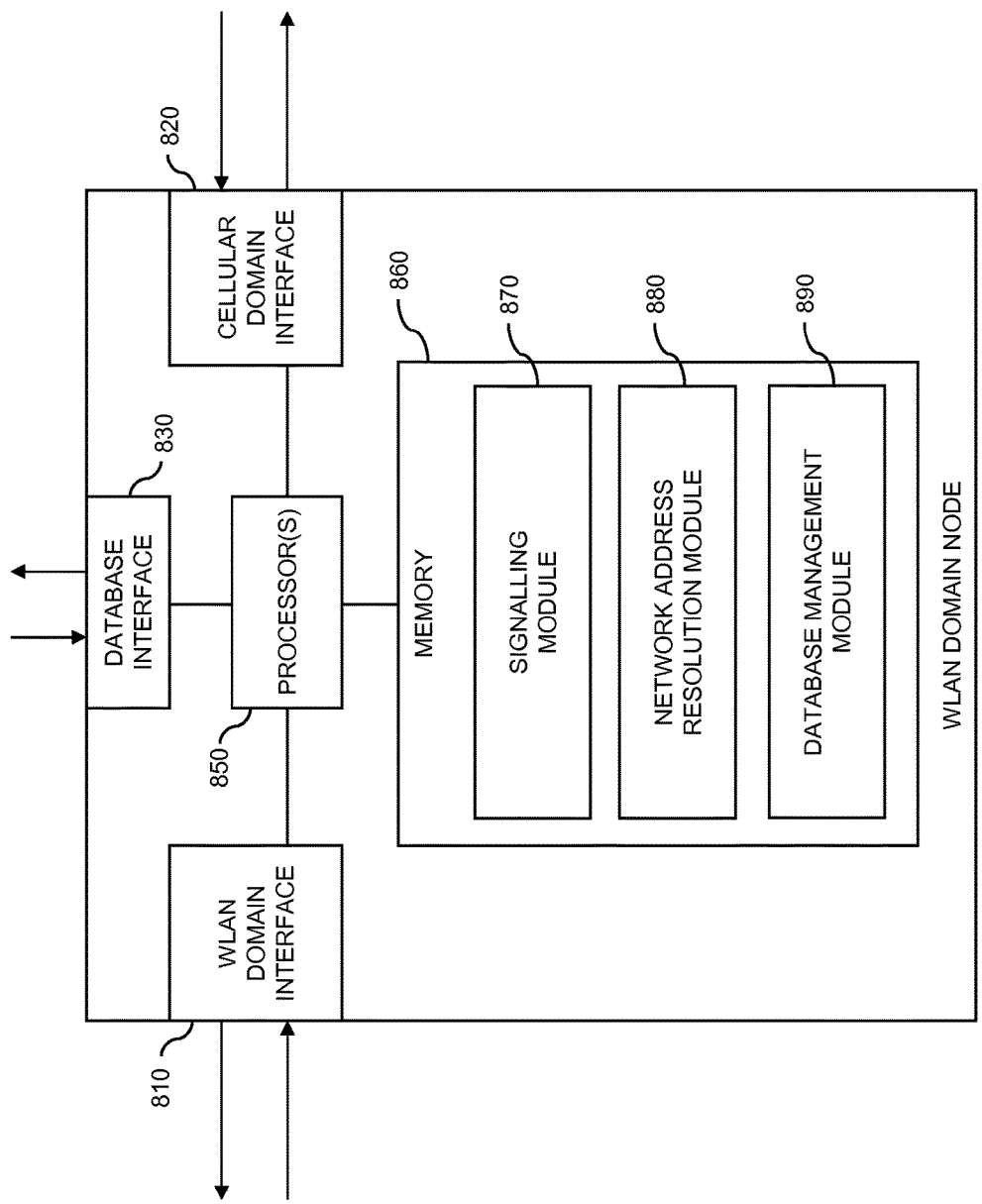
FIG. 8 schematically illustrates a device according to an embodiment of the invention, which may be used for implementing a node of a WLAN domain.

FIG. 8 illustrates exemplary structures of a device for implementing a node for a WLAN domain which operates in accordance with the above concepts. For example, the illustrated structures may be used to implement an WLAN AP, such as the WLAN AP 150, or a gateway associated with one or more WLAN APs, such as the TWAG 160.

In the illustrated example, the node includes a WLAN domain interface 810 for communication with other nodes of the WLAN domain or with the UE. Further, the node includes a cellular domain interface 820 for communication with one or more nodes of the cellular network domain. If the node has functionalities of a WLAN AP, the WLAN domain interface 810 may correspond to the WLAN radio interface for communication with the UE, as for example specified by IEEE 802.11 or its extensions, such as IEEE 802.11a, IEEE 802.11b/g, IEEE 802.11n, or IEEE 802.11ac. If the node has functionalities of a gateway, the WLAN domain interface 810 may correspond to an IP based interface. The cellular domain interface 820 may correspond to an IP based interface, e.g., using HTTP, HTTPS, RADIUS, or DIAMETER. Further, the node includes a database interface 830 for communication with a network address database, e.g., a DNS based network database such as implemented by the DNS servers 120, 170, 175, 190. Also the database interface 830 may be IP based.

Further, the node includes one or more processor(s) 850 coupled to the interfaces 810, 820 and 830, and a memory 860 coupled to the processor(s) 850. The memory 860 may include a ROM, e.g., a flash ROM, a RAM, e.g., a DRAM or SRAM, a mass storage, e.g., a hard disk or solid state disk, or the like. The memory 860 includes suitably configured program code modules to be executed by the processor(s) 850 so as to implement the above-described functionalities of the node of the WLAN domain. More specifically, the program code modules in the memory 860 may include a signalling module 870 so as to implement the above-described functionalities of receiving requests for information on a WLAN AP and receiving or forwarding the information on the WLAN AP. Further, the program code modules in the memory 860 may include a network address resolution module 880 so as to implement the above-described functionalities of resolving the network address to be used for obtaining information on the WLAN AP. Still further, the memory 860 may include a database management module 890 so as to implement the above-mentioned functionalities for updating the network address database.

It is to be understood that the structures as illustrated in FIG. 8 are merely schematic and that the node may actually include further components which, for the sake of clarity, have not been illustrated, e.g., further interfaces or further processors. Also, it is to be understood that the memory 860 may include further types of program code modules, which have not been illustrated, e.g., program code modules for implementing known functionalities of a WLAN AP or gateway. In some implementations, also a computer program may be provided for implementing functionalities of the node, e.g., in the form of a physical medium storing the program code modules to be stored in the memory 860 or by making such program code available for download.

Figure 9:
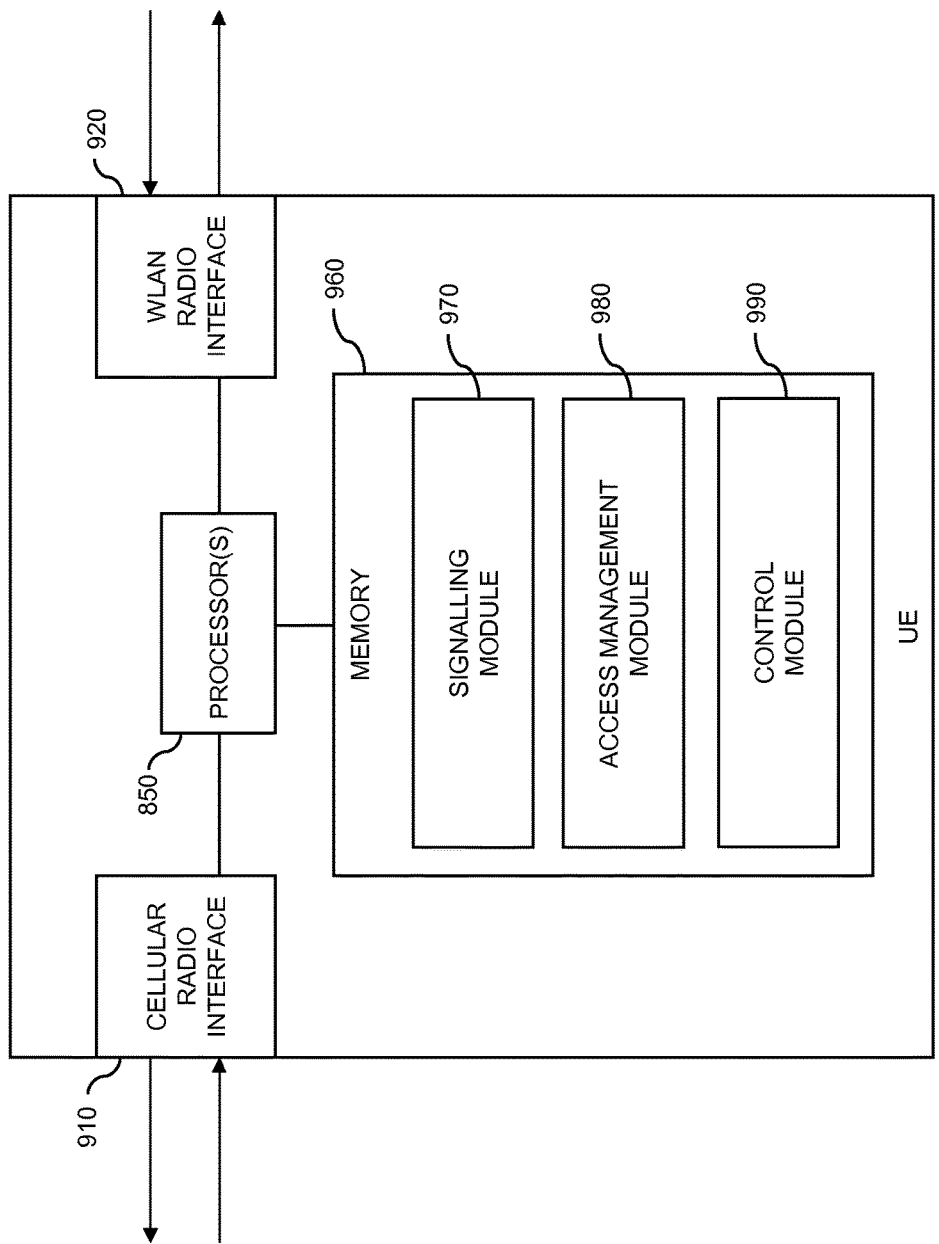
FIG. 9 schematically illustrates a UE according to an embodiment of the invention.

FIG. 9 illustrates exemplary structures of a UE operates in accordance with the above concepts. For example, the illustrated structures may be used to implement the UE 50.

In the illustrated example, the UE includes a cellular radio interface 910 for communication with a cellular network domain and a WLAN radio interface 920 for communication a WLAN network domain. The cellular radio interface 910 may correspond to the LTE Uu radio interface, and the WLAN radio interface may correspond to a WLAN radio interface as for example specified by IEEE 802.11 or its extensions, such as IEEE 802.11a, IEEE 802.11b/g, IEEE 802.11n, or IEEE 802.11ac.

Further, the UE includes one or more processor(s) 950 coupled to the interfaces 910 and 920, and a memory 960 coupled to the processor(s) 950. The memory 960 may include a ROM, e.g., a flash ROM, a RAM, e.g., a DRAM or SRAM, a mass storage, e.g., a hard disk or solid state disk, or the like. The memory 960 includes suitably configured program code modules to be executed by the processor(s) 950 so as to implement the functionalities of the UE as described above. More specifically, the program code modules in the memory 960 may include a signalling module 970 so as to implement the above-described functionalities of receiving management frames, sending reports, or receiving information on a WLAN AP. Further, the program code modules in the memory 960 may include an access management module 980 so as to implement the above-described functionalities of controlling utilization of a WLAN AP by the UE. Still further, the memory 960 may include a control module 990 so as to implement generic control functionalities, e.g., control of the interfaces 910, 920.

It is to be understood that the structures as illustrated in FIG. 9 are merely schematic and that the UE may actually include further components which, for the sake of clarity, have not been illustrated, e.g., further interfaces or further processors. Also, it is to be understood that the memory 960 may include further types of program code modules, which have not been illustrated, e.g., program code modules for implementing known functionalities of a UE. In some implementations, also a computer program may be provided for implementing functionalities of the UE, e.g., in the form of a physical medium storing the program code modules to be stored in the memory 960 or by making such program code available for download.

As can be seen, the concepts as described above may be used for efficiently obtaining information on a WLAN AP. In particular, the information on the WLAN AP point can be obtained with only limited participation of the UE, which only needs to provide the ID of the WLAN AP. In this way, battery power and other resources of the UE may be saved.

It is to be understood that the examples and embodiments as explained above are merely illustrative and susceptible to various modifications. For example, the illustrated concepts could be used in connection with various types of cellular network technologies, without limitation to the above-mentioned LTE technologies. Further, the concepts could also be implemented in connection with other kinds of network address databases, e.g., a proprietary database hosted by the operator of the cellular network domain. Moreover, it is to be understood that the above concepts may be implemented by using correspondingly designed software to be executed by one or more processors of an existing device, or by using dedicated device hardware.

The invention claimed is:

1. A method of supporting interworking between a cellular network domain and a wireless local area network domain, the method comprising:
receiving, by a node of the cellular network domain, a report from a user equipment, the report indicating an identity of an access point of the wireless local area network domain, the identity being indicated in a management frame received by the user equipment from this access point;
resolving, by the node, a network address associated with the access point by using the indicated identity and a network address database;
sending, by the node, a request to the resolved network address; and
in response to the request, receiving, by the node, information on the access point.

2. The method of claim 1, further comprising indicating, by the node, the information on the access point to the user equipment.

3. The method of claim 1, further comprising controlling, by the node and based on the information on the access point, utilization of the access point by the user equipment.

4. The method of claim 1, wherein the network address database is based on the Domain Name System (DNS).

5. The method of claim 4, further comprising:
constructing, by the node, a fully qualified domain name from the indicated identity; and
obtaining, by the node, the network address based on the fully qualified domain name.

6. The method of claim 1, wherein the identity of the access point comprises at least one of: a Basic Service Set Identifier, a Homogeneous Extended Service Set Identifier, and a Service Set Identifier.

7. A device for implementing a node of a cellular network domain, the device comprising:
a first interface for communication with a user equipment;
a second interface for communication with a wireless local area network domain;
a third interface for communication with a network address database;
processing circuitry;
memory containing instructions executable by the processing circuitry whereby the device is operative to:
receive, via the first interface, a report from the user equipment, the report indicating an identity of an access point of the wireless local area network domain, the identity being indicated in a management frame received by the user equipment from this access point;
resolve a network address associated with the access point by using the indicated identity and the network address database;
send a request to the resolved network address; and
in response to the request, receive information on the access point.

8. The device of claim 7, wherein the instructions are such that the device is operative to indicate the information on the access point to the user equipment.

9. The device of claim 7, wherein the instructions are such that the device is operative to, based on the information on the access point, control utilization of the access point by the user equipment.

10. The device of claim 7, wherein the instructions are such that the device is operative to:
construct a fully qualified domain name from the indicated identity; and
obtain the network address based on the fully qualified domain name.

11. A computer program product stored in a non-transitory computer readable medium for supporting interworking between a cellular network domain and a wireless local area network domain, the computer program product comprising software instructions which, when run on processing circuitry of a node of the cellular network domain, causes the node to:
receive a report from a user equipment, the report indicating an identity of an access point of the wireless local area network domain, the identity being indicated in a management frame received by the user equipment from this access point;

resolve a network address associated with the access point by using the indicated identity and a network address database;

send a request to the resolved network address; and in response to the request, receive information on the access point.

12. The computer program product of claim 11, wherein the software instructions, when run the processing circuitry of the node, further causes the node to indicate the information on the access point to the user equipment.

13. The computer program product of claim 11, wherein the software instructions, when run the processing circuitry of the node, further causes the node to, based on the information on the access point, control utilization of the access point by the user equipment.

14. The computer program product of claim 11, wherein the software instructions, when run the processing circuitry of the node, further causes the node to:

construct a fully qualified domain name from the indicated identity; and obtain the network address based on the fully qualified domain name.

* * * * *

UNITED STATES PATENT AND TRADEMARK OFFICE
CERTIFICATE OF CORRECTION

PATENT NO. : 10,117,159 B2
APPLICATION NO. : 15/119515
DATED : October 30, 2018
INVENTOR(S) : Ivo Sedlacek It is certified that error appears in the above-identified patent and that said Letters Patent is hereby corrected as shown below:

On the Title Page
Item (57), under "ABSTRACT", in Column 2, Line 4, delete "access point (50)." and insert -- access point (150). --, therefor.

In the Drawings
In Fig. 9, Sheet 9 of 9, delete Tag "850" and insert Tag -- 950 --, therefor.

In the Specification
In Column 1, Line 26, delete "can to" and insert -- can --, therefor.

In Column 4, Line 23, delete "an radio" and insert -- a radio --, therefor.

In Column 4, Line 43, delete "HSSID" and insert -- HESSID --, therefor.

In Column 5, Line 47, delete "eNB 110" and insert -- eNB 100 --, therefor.

In Column 8, Line 15, delete "eNB 110," and insert -- eNB 100 --, therefor.

In Column 9, Line 22, delete "eNB 110" and insert -- eNB 100 --, therefor.

In Column 10, Line 32, delete "the a" and insert -- the --, therefor.

In the Claims
In Column 15, Line 11, in Claim 12, delete "run the" and insert -- run on the --, therefor.

In Column 15, Line 15, in Claim 13, delete "run the" and insert -- run on the --, therefor.

In Column 15, Line 20, in Claim 14, delete "run the" and insert -- run on the --, therefor.

Signed and Sealed this
Ninth Day of April, 2019

Andrei Iancu
*Director of the United States Patent and Trademark Office*